March 14, 1961 A. E. KOLBE 2,974,655
FRAME ASSEMBLY FOR INTERNAL COMBUSTION ENGINES
Filed Sept. 17, 1959 2 Sheets-Sheet 2

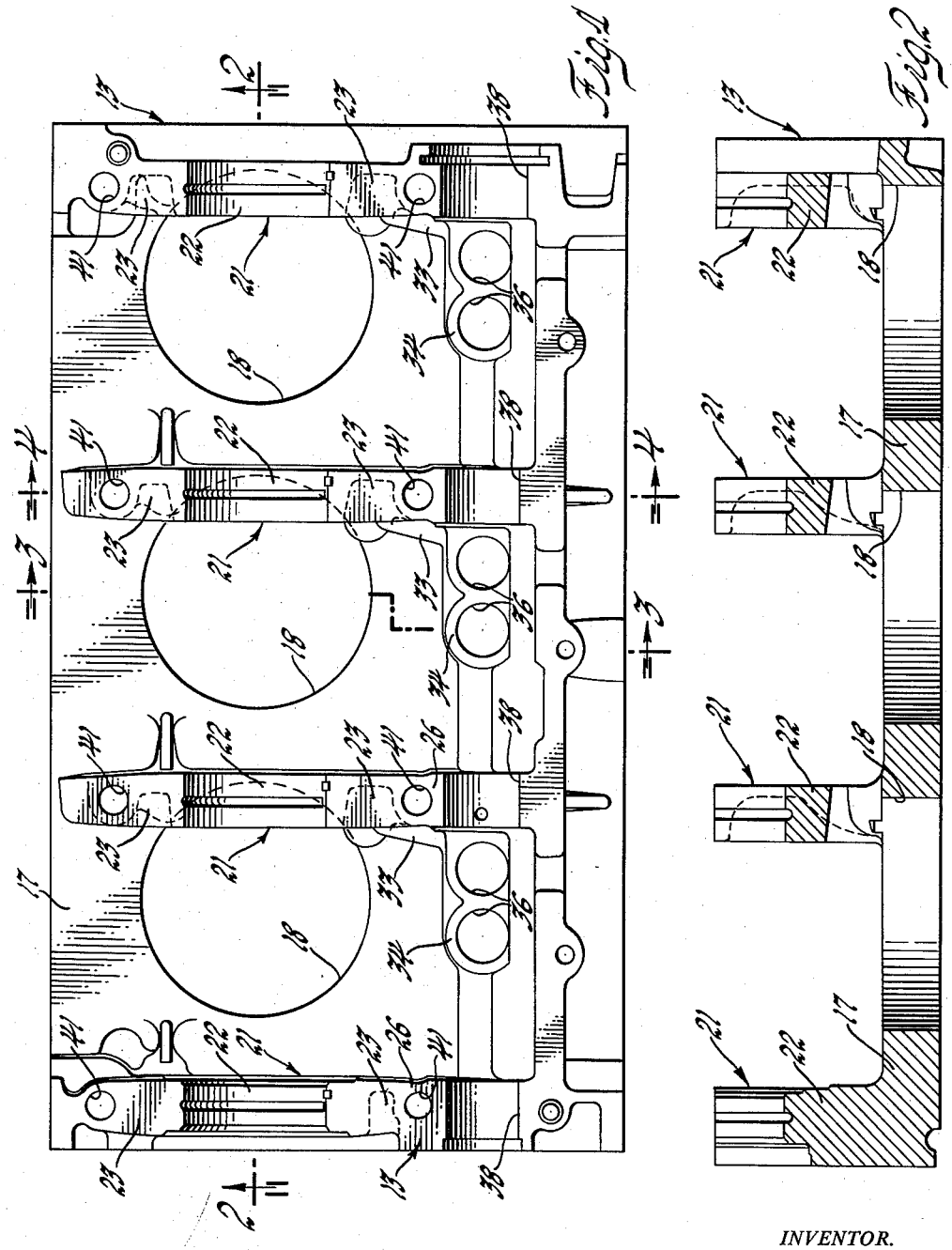

INVENTOR.
Adelbert E. Kolbe
BY
L. D. Burch
ATTORNEY

United States Patent Office 2,974,655
Patented Mar. 14, 1961

2,974,655
FRAME ASSEMBLY FOR INTERNAL COMBUSTION ENGINES

Adelbert E. Kolbe, Berkley, Mich., assignor to General Motors Corporation, Detroit, Mich., a corporation of Delaware Filed Sept. 17, 1959, Ser. No. 840,589

1 Claim. (Cl. 123—56)

This invention relates to frame assemblies for internal combustion engines and has particular relation to a frame assembly for an opposed cylinder internal combustion engine for automotive and other purposes.

In constructed internal combustion engines having parallel rows of cylinders at 180° it has been the practice to divide the crankcase into compartments for each pair of opposed cylinders by employing webs extending inwardly from the sidewalls of oppositely disposed crankcase members. The webs terminate at the inner extremities in bearing supports adapted to support the journals of the crankshaft when the crankcase members were bolted together. The cranks and connecting rods for each pair of opposed cylinders would be located in parallel in each of these compartments, which would necessitate offsetting the cylinders in the rows in opposite directions longitudinally of the engine. This would cause the webs of one crankcase member to engage the bearing supports at one end and the webs of the other crankcase member to engage the bearing supports at the opposite end. When the engine was operated the webs would be heated by the cylinders which would cause the webs to expand and to twist the bearing supports out of alignment so that it was difficult to maintain the bearings in such an engine in good condition for as long as was considered desirable. Twisting of the bearing supports would cause the load to be concentrated at one of the bearings on one side and at the opposite end of the bearings on the other side. This concentration of loads at the ends of the bearings would cause excessive bearing wear which reduced the effective life of the bearings.

It is proposed to correct this difficulty by employing piers for supporting the bearing supports with openings between the piers and the bearing supports and the sidewalls of the crankcase members supporting the cylinders to provide a thermal brake in the crankcase members opposite the middle and throughout the greater part of the extent of each of the bearing supports. The piers are arranged in parallel and are spaced from the middle parts of the bearing supports that support the bearings and they are arranged in planes normally intersecting the axis of the bearing supports midway between the ends of the bearings. It is also proposed to employ webs providing diagonal braces at the ends of the bearing supports for reinforcing the piers and the bearing supports and the bosses supporting the valve lifters of the engine.

In the drawings:

Figure 1 is a side elevational view from the inside of one of the crankcase members embodied in the engine illustrated by Figure 5. Figure 1 is taken substantially in the plane of line 1—1 on Figure 5 looking in the direction of the arrows.

Figure 2 is a longitudinal sectional view of the crankcase member illustrated by Figure 1. Figure 2 is taken in the plane of line 2—2 on Figure 1 looking in the direction of the arrows.

Figure 3:
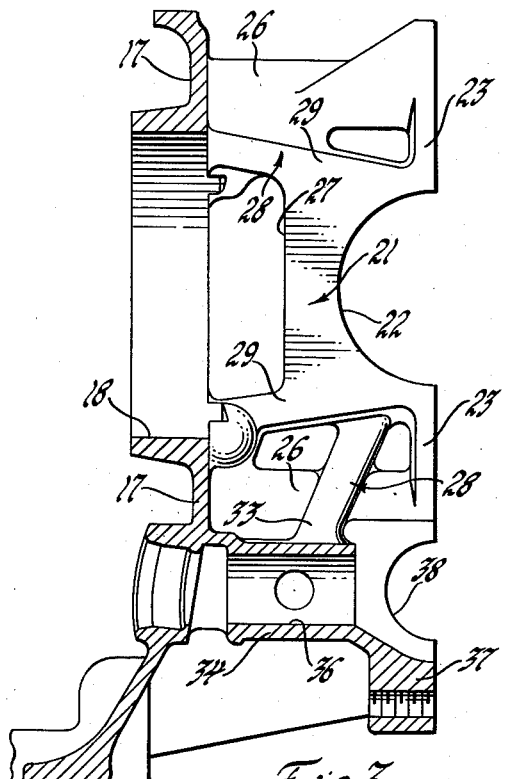
Figure 4:
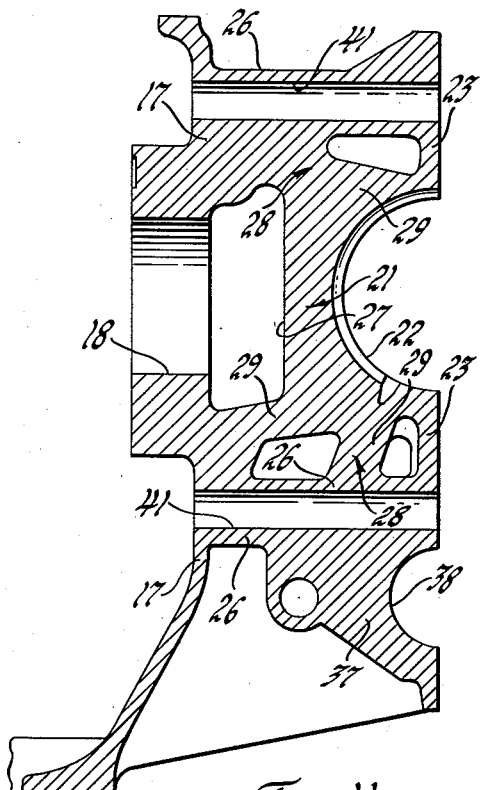

Figures 3 and 4 are cross-sectional views of the crankcase member illustrated by Figures 1 and 2. Figures 3 and 4 are taken substantially in the planes of lines 3—3 and 4—4 on Figure 1, looking in the direction of the arrows.

Figure 5:
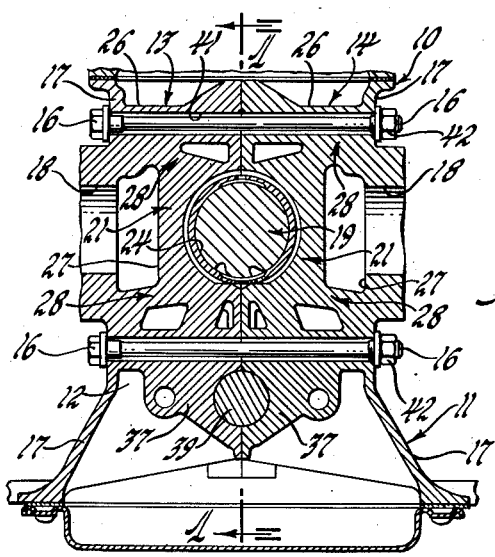

Figure 5 is a fragmentary cross-sectional view of a 180° opposed cylinder internal combustion engine embracing the frame assembly embodying the invention.

The engine 10 has a frame assembly 11 including a crankcase 12 formed by securing oppositely disposed crankcase members 13 and 14 together by bolts 16. The crankcase members 13 and 14 include oppositely disposed outer sidewalls 17 in which rows of cylinder openings 18 are formed. The cylinder openings 18 in the crankcase members 13 and 14 are offset from one another in opposite directions to dispose the cylinders in oppositely disposed pairs of cylinders in offset relation. The connecting rods for the pistons of the offset pairs of cylinders may then engage parallel cranks formed on the crankshaft 19 of the engine. In order to make the engine as short as possible it has been found desirable to locate the bearing supports 21 for the crankshaft 19 on opposite sides of the offset or oppositely disposed pairs of cylinders in such a way as to overlap the cylinders in one row on one side and the cylinders in the opposite row on the other side of the cylinders. Figures 1 and 2 illustrate how the bearing supports 21 overlap the openings 18 receiving the cylinders in the row of cylinders extending from the crankcase member 13. The bearing supports in the crankcase member 14 similarly overlap the cylinder openings 18 for the cylinders extending from the opposite side of the engine. The bearing supports 21 each may include an arcuate middle part 22 terminating in straight oppositely disposed ends 23. The arcuate middle parts 22 and the ends 23 are of substantially the same width throughout the transverse length of the bearing supports and are relatively thick and rigid to provide beam like bearing support members extending transversely of the crankshaft 19 on opposite sides of each of the journals for the crankshaft. The bearing supports may contain bushings 24 engaging the journals of the crankshaft to provide rotational support for the crankshaft 19. The bearing supports 21 are adapted to be supported at each end 23 by parallel pairs of piers 26 that extend from the sidewalls 17 of the crankcase members 13 and 14 to the bearing support ends 23. The pairs of piers 26 for each bearing support 21 in each of the crankcase members 13 and 14 are disposed in planes normal to the axis of the crankshaft and intersecting the bearing supports midway between the axially disposed ends of the bearing supports. Located between the arcuate middle parts of the bearing supports 21 and the piers 26 and the sidewalls 17 are elongated openings indicated at 27. The openings 27 prevent the heat resulting from the operation of the cylinders of the engine from being conducted from the cylinders directly to the arcuate middle parts 22 of the bearing supports 21. The openings 27 extend nearly to the piers 26 at the opposite ends of the openings and far enough to provide an effective thermal brake between the sidewalls 17 and the middle parts 22 of the bearing supports 21. However, there is web means 28 that provides reinforcement between the ends 23 of the bearing supports 21 and the piers 26 and parts of the sidewalls 17 adjacent the outer ends of the piers 26. Such web means includes obliquely disposed braces such as are indicated at 29. Also the web means 29 may include obliquely disposed braces 33 that extend from the supports 21 to bosses 34 in which valve lifter openings 36 are provided. The bosses 34 are arranged in pairs between the sidewalls 17 and extensions 37 beyond the lower ends of the supports 21, the extensions being provided with bearing supports 38 for the camshaft 39 of the engine. The extensions 37 also merge with the lower rows of piers 26 so that the extensions will be diagonally braced from the sidewalls 17 at the outer ends of the lower rows of the piers 26. The piers 26 may be formed in any suitable manner but it is proposed to form these as tubular columns with openings 41 therein to receive the bolts 16. The bolts 16 may be provided with nuts 42 to be tightened to compress the piers 26 to support the ends of the bearing supports 38 and the extensions 37.

It will be apparent that any heat that is conducted to the bearing supports 21 will be conducted mostly through the piers 26 and the webs 28 thereby equalizing the stresses between opposite axially disposed ends of the bearing supports 21 and eliminating any twisting of the bearings upon the journals of the crankshaft 19.

What is claimed is:

A frame assembly for an internal combustion engine and comprising a pair of crankcase members each having a row of oppositely disposed bearing supports formed in adjacent surfaces thereof, said bearing supports being formed with arcuate middle parts with straight and oppositely disposed ends at the extremities of said middle parts, said crankcase members being adapted to be secured together to provide a crankcase for said engine with said oppositely disposed bearing supports engaging one another at said ends to provide bearings for the crankshaft of said engine, said crankcase members also being formed to provide oppositely disposed sidewalls having rows of cylinder openings therein, said cylinder openings in one of said sidewalls being offset lengthwise of said engine from said cylinder openings in the other of said sidewalls, said cylinder openings in said rows being arranged in similarly offset pairs of cylinder openings on opposite sides of said crankcase, said offset cylinder openings in each of said pairs being disposed between adjacent pairs of said bearings in said crankcase, said crankcase members also being formed to provide bosses opposite said cylinder openings and having valve lifter receiving openings therein extending substantially in parallel relation to the axis of said cylinder openings, said crankcase members also being formed to provide parallel piers extending between said sidewalls of said crankcase and said ends of said bearing supports, said piers being spaced from said middle parts by said ends, said piers being arranged in pairs of piers for each of said bearing supports and with said pairs of piers for the bearing supports in one of said crankcase members being aligned with the pairs of piers for said bearing supports in the other of said crankcase members and with said pairs of piers for each of said bearing supports being disposed symmetrically with respect to each of said bearing supports and in planes normally intersecting the axis of said crankshaft midway between the ends of said bearings, said crankcase members between said piers in each pair and between said bearing supports and said sidewalls being formed to provide openings extending across said middle parts and terminating opposite said ends, said openings providing thermal and stress insulating means between said sidewalls and said bearing supports for preventing axial distortion of said bearing supports and injury to and excessive wear on the bearings supporting said crankshaft for said engine, said piers and said bearing supports and said bosses beyond said ends of said openings being reinforced by web means extending between said piers and said bearing supports and said bosses, said web means being formed to provide spaced and obliquely disposed brace means extending between said piers and said bearing support ends and said bosses, and means compressing said piers and securing said crankcase members together.

References Cited in the file of this patent

UNITED STATES PATENTS 2,311,146     Wiegman  ---------------  Feb. 16, 1943